United States Patent [19]
Chen et al.

[11] Patent Number: 5,939,117
[45] Date of Patent: Aug. 17, 1999

[54] METHODS FOR PRESERVING FRESH FRUIT AND PRODUCT THEREOF

[75] Inventors: Chao Chen, Shrewsbury, Mass.; Thomas A. Trezza, Concord, Calif.; Dominic W. S. Wong, El Cerrito, Calif.; Wayne M. Camirand, Albany, Calif.; Attila E. Pavlath, Walnut Creek, Calif.

[73] Assignees: Mantrose-Haeuser Co., Inc., Attleboro, Mass.; The United States of America as represented by the Department of Agriculture, Washington, D.C.

[21] Appl. No.: 08/909,196

[22] Filed: Aug. 11, 1997

[51] Int. Cl.[6] .................................................. A23L 1/27
[52] U.S. Cl. ..................... 426/267; 426/268; 426/270; 426/271; 426/310; 426/541; 426/615
[58] Field of Search .................. 426/267, 268, 426/270, 271, 310, 541, 615

[56] References Cited

U.S. PATENT DOCUMENTS

| | | | |
|---|---|---|---|
| 3,754,938 | 8/1973 | Ponting | 99/154 |
| 4,006,257 | 2/1977 | Kolk . | |
| 4,011,348 | 3/1977 | Farrier et al. . | |
| 4,818,549 | 4/1989 | Steiner et al. . | |
| 4,882,190 | 11/1989 | Olson et al. | 426/267 |
| 4,960,600 | 10/1990 | Kester et al. . | |
| 4,988,522 | 1/1991 | Warren . | |
| 5,055,313 | 10/1991 | Warren . | |
| 5,126,153 | 6/1992 | Beck . | |
| 5,198,254 | 3/1993 | Nisporos-Carriedo et al. . | |
| 5,376,391 | 12/1994 | Nisporos-Carriedo et al. . | |
| 5,389,389 | 2/1995 | Beck . | |

FOREIGN PATENT DOCUMENTS

| | | |
|---|---|---|
| 97/23138 | 7/1997 | WIPO . |

OTHER PUBLICATIONS

"Control of Enzymatic Browning in Apple with Ascorbic Acid Derivatives, Polyphenol Oxidase Inhibitors, and Complexing Agents" by Sapers, et al., *Journal of Food Science*, vol. 54, No. 4, 1989, pp. 997–1002

"Inhibition of Apple Polyphenoloxidase (PPO) by Ascorbic Acid, Citric Acid and Sodium Chloride" by Pizzocaro, et al., *Journal of Food Processing and Preservation*, 17 (1993) pp. 21–30.

"Inhibition of Enzymatic Browning in Apple Products by 4–Hexylresorcinol" by Monsalve–Gonzalez, et al., *Food Technology*, vol. 49, Apr. 1995, pp. 110–117.

"Control of Browning During Storage of Apple Slices Preserved by Combined Methods. 4–Hexylresorcinol as Anti–Browning Agent" by Monsalve–Gonzalez, et al., *Journal of Food Science*, vol. 58, No. 4, 1993, pp. 797–826.

"Enzymatic Browning Inhibited in Fresh and Dried Apple Rings by Pineapple Juice" by Lozano–de–Gonzalez, et al., *Journal of Food Science*, vol. 58, No. 2, 1993, pp. 399–404.

"Calcium Alginate Films: Thermal Properties and Permeability to Sobate and Ascorbate" by Wong, et al. *Journal of Food Science*, vol. 61, No. 2, 1996, pp. 337–341.

(List continued on next page.)

*Primary Examiner*—Helen Pratt
*Attorney, Agent, or Firm*—Calfee, Halter & Griswold LLP

[57] ABSTRACT

Methods of preserving fresh fruit with fresh fruit preservatives which extend the shelf life of fresh fruit particularly fresh cut fruit, are provided. The fresh fruit preservative preserves the texture, flavor, appearance, crispness, and color of the fresh fruit, particularly the exposed skin of the fresh fruit. The method includes the following steps: providing a solution of fruit preservative comprising: water, calcium ions; and ascorbate ions, wherein the calcium ion and ascorbate ions are present in a ion ratio of preferably from about 1.5:1 to about 2.5:1; and, applying said fruit preservative to the fruit. Preferably the fruit is then stored at a temperature which will not freeze the fruit; temperatures of −6° C. have been found not to freeze the apples. Preferably the fruit is stored at temperatures of between about −7° C. to room temperature, about 20° C., more preferably about −2° to about 7° C., most preferably from about 2° C. to about 5° C. The invention also relates to fresh fruits preserved with the fresh fruit preservatives.

28 Claims, 1 Drawing Sheet

OTHER PUBLICATIONS

"Gas Exchange in Cut Apples with Bilayer Coatings" by Wong, et al., *Agricultural and Food Chemistry,* Oct. 1994, pp. 2278–2285.

"Development of Edible Coatings for Minimally Processed Fruits and Vegetables" by Wong, et al., *Edible Coatings and Films to Improve Food Quality,* Editors Krochta, et al., 1994 (Chapter 3).

Abstract No. 65 for "Treatment for Sliced Avocados to Reduce Discoloration", Camirand, et al., 1994 Western Regional ACS Meeting and Pacific Conference, Oct. 19–22, 1994.

"Reporting Of Objective Color Measurement" by McGuire, *HortScience,* vol. 27(12), Dec. 1992, p. 1254–1255.

"Heated Ascorbic/Citric Acid Solution as Browning Inhibitor for Pre–Peeled Potatoes" by Sapers, et al., *Journal of Food Science,* vol. 60, No. 4, 1995, pp. 762–776.

"New Approaches in Improving the Shelf Life of Minimally Processed Fruit and Vegetables" by Ahvenainen, *Trends in Food Science and Technology,* Jun. 1996, vol. 7, pp. 179–187.

"Color of Minimally Processed Potatoes as Affected by Modified Atmosphere Packaging and Antibrowning Agents" by Gunes, et al., *Journal of Food Science,* vol. 62, No. 3, 1997, pp. 572–575.

METHODS FOR PRESERVING FRESH FRUIT AND PRODUCT THEREOF

BACKGROUND OF THE INVENTION

Fresh fruit rapidly deteriorates particularly when the flesh of the fruit is exposed, such as by peeling the skin or by slicing the fruit. The appearance, flavor, texture, and crispness rapidly degrades. Within hours, fruit, such as apples, begins to turn brown and lose its distinctive flavor. The fruit loses its texture and hardness; the fruit becomes soft and loses its characteristic crispness.

Methods of preservation involve cooking which changes flavor and texture; typically appearance is also changed. Freezing substantially preserves flavor; however texture and crispness are affected. Furthermore, frozen foods need to be continually stored and require freezers for storage. Drying often preserves flavor but texture, crispness and appearance are substantially affected. Refrigeration helps to preserve crispness texture and flavor for a limited number of hours but does not prevent browning. Chemical preservatives are often used alone or in conjunction with these methods of preserving, however they typically leave a residual taste.

One method employs four active ingredients an acidulant such as citric acid, a metal sequesterant or chelant such as sodium acid polyphosphate, an enzyme inhibitor such as calcium chloride and an antioxidant such as ascorbic acid. However, the fruit has an unpleasant taste and the fruit typically turns brown within 5 days.

Citric acid, which is present in lemon juice, has been used to delay browning in fruits; however, the fruit tastes sour, becomes soft and soggy, and typically within hours the fruit turns brown.

Sodium ascorbate has also been used to preserve fruit; while the color degradation is delayed, the fruit has a noticeable taste.

Other methods often involve forming a film on the surface of the fruit; however such films often leave an unacceptable gummy feel when eaten.

It would be desirable to have a method for preserving fruit, particularly cut fruit, which preserves the appearance, color, texture crispness and flavor, yet does not leave an after taste nor require cooking, drying or freezing.

SUMMARY OF THE INVENTION

The present invention pertains to methods of preserving fresh fruit with a fresh fruit preservative which extend the shelf life of fresh fruit, particularly cut fresh fruit. The fresh fruit preservative preserves the texture, flavor, appearance, crispness, and color of the fresh fruit, particularly the exposed skin of the fresh fruit. The method comprises the following steps: providing a solution of fruit preservative comprising: water, calcium ions; and ascorbate ions, wherein the calcium ion and ascorbate ions are present in a ion ratio of preferably from about 1.5:1 to about 2.5:1; and, applying said fruit preservative to the fruit. Preferably the fruit is then stored at a temperature which will not freeze the fruit; temperatures of $-6°$ C. have been found not to freeze the apples. Preferably the fruit is stored at temperatures of between about $-7$ to room temperature, about $20°$ C., more preferably about $-2$ to about $7°$ C., most preferably from about $2°$ to about $5°$ C. The invention also relates to fresh fruits preserved with the fresh fruit preservatives.

DETAILED DESCRIPTION OF THE INVENTION

Figure 1:
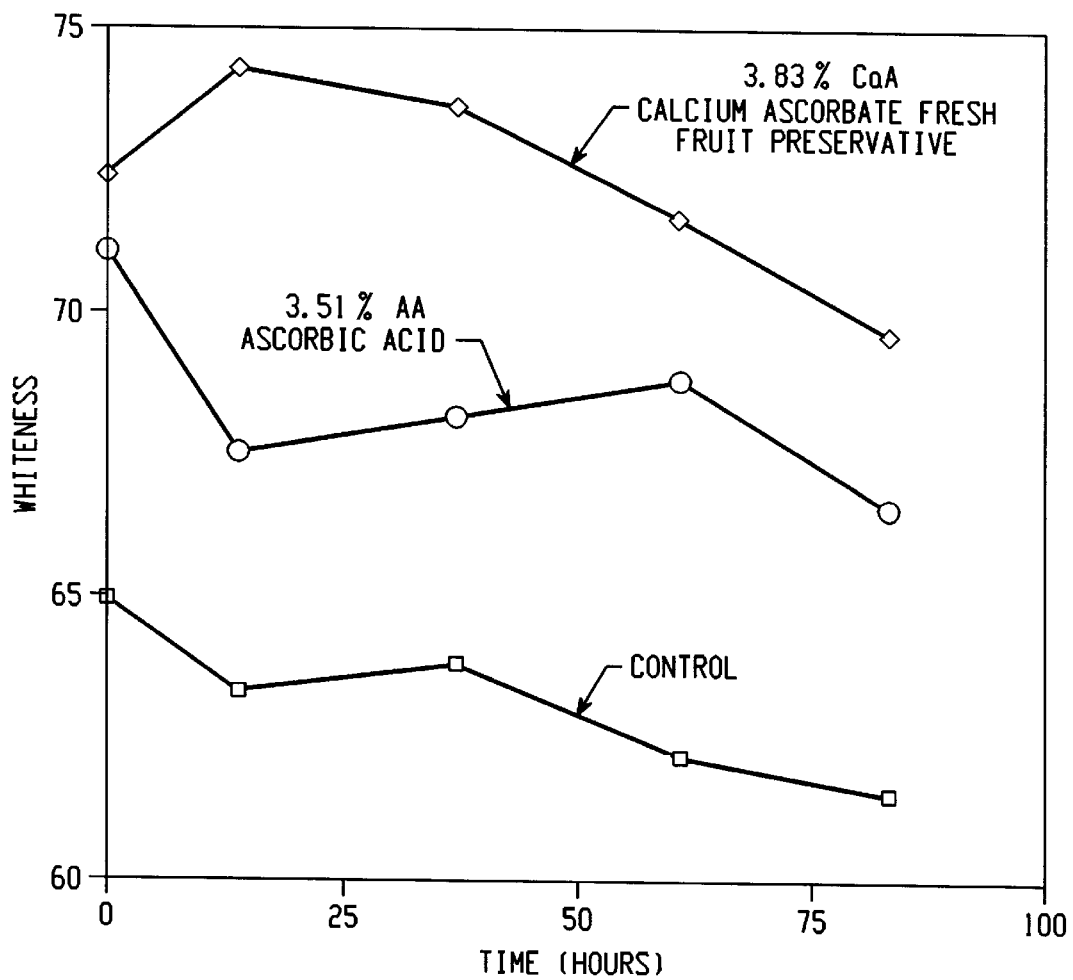
FIG. 1 is a graph showing the whiteness of sliced apples treated with the fresh fruit preservative as compared to apples treated with ascorbic acid.

The present invention pertains to methods of preserving fresh, that is, uncooked, fruit with a fresh fruit preservative which extends the shelf life of the fresh fruit, particularly cut fresh fruit. The fresh fruit preservative preserves the texture, flavor, appearance, crispness, color of the tree fruits, such as for example, avocado and pome fruits such as apples and pears. The method comprises the following steps: providing a solution of fruit preservative comprising: water, calcium ions; and ascorbate ions, wherein the ascorbate ion and calcium ions are present in a ion ratio of preferably from about 1.5:1 to about 2.5:1; and, applying such fruit preservative to the fruit. The fresh fruit preservative is applied using conventional techniques preferably for a time sufficient to coat the fruit with the fresh fruit preservative. Suitable techniques are spraying, sprinkling and dipping. Preferably the fruit is then stored at a temperature which will not freeze the fruit; temperatures of $-6°$ C. have been found not to freeze the apples. Preferably the fruit is stored at temperatures of between about $-7$ to room temperature, about $20°$ C., more preferably about $-2$ to $7°$ C., most preferably form about 2 to $5°$ C. Fresh fruit preserved with fresh fruit preservative which is stored at room temperature will maintain color, flavor, texture and taste, however after extended periods may have a microbial content that is not desirable.

The method inhibits freshly cut fruit from browning; for example, fruits are prevented from browning for at least 2 weeks, preferably 3 weeks or more while maintaining the freshness, crispness, texture, color and flavor of the fruit without any residual taste. The exact length of the period of preservation depends upon the initial fruit quality, the species and the variety of the fruit and growing conditions of the fruit. The method of the present invention offers the advantage in that the preserved apples may be stored under standard atmospheric pressure and standard atmospheric conditions; that is, the method does not require that the apples be stored under vacuum or inert atmosphere. The method of preserving fruit does not require that the food be cooked, dried or frozen. The method offers the advantage in that it does not require preservatives such as sulfites. However, after the fruit is preserved with the fresh fruit preservative, it may be dried or freeze dried for use as for example food or potpourri; the fresh fruit preservative will further delay the browning that eventually occurs in dried and freeze dried fruits. In the event that such dried or freeze dried fruit is reconstituted, the fruit will be less brown than had the fruit not been preserved with the fresh fruit preservative.

The Fresh Fruit Preservative

The fresh fruit preservative is preferably a solution which contains water and calcium ions and ascorbate ions or erythorbate ions or mixtures thereof. The source of the calcium ion is preferably a calcium hydroxide or a calcium salt or a mixture thereof. Suitable calcium salts are, for example, calcium chloride, calcium carbonate, calcium phosphate, calcium erythorbate, calcium acetate, calcium gluconate, calcium glycerophosphate, calcium lacatate, calcium ascorbate and mixtures thereof. The source of the ascorbate ion is ascorbic acid, erythorbic acid, or an ascorbate or erythorbate salt such as calcium ascorbate or calcium erythorbate. Preferably calcium ascorbate is the source for both the calcium ion and the ascorbate ion. When added to water the ascorbic acid disassociates at least partially into the ascorbate ion and a hydrogen ion; the calcium salt disassociates into the calcium ion and the corresponding anion. Where the calcium ascorbate is employed the fresh fruit preservative may also be used in the dry form; in the dry form the fresh fruit preservative is preferably powdered or granular.

The percentage of the dry ingredients, exclusive of water, in the fresh fruit preservative are: from about 10% to about 100%, more preferably from about 12% to about 40%, most preferably from about 15% to about 35% of a calcium salt; where the calcium salt is a salt other than calcium ascorbate or calcium erythorbate, there is from about 50% to about 90%, more preferably from about 60% to about 88%, most preferably from about 65% to about 85% ascorbic acid. Where the calcium salt is calcium ascorbate or calcium erythorbate, ascorbic acid is not necessary and is not preferred.

Where the calcium salt is calcium chloride, the percentage of the dry ingredients exclusive of water, in the fresh fruit preservative is preferably from about 55% to about 90%, more preferably from about 60% to about 80%, most preferably from about 63% to about 67%, ascorbic acid and from about 10% to about 40%, more preferably from about 20% to about 35%, most preferably from about 25% to about 30%, calcium chloride.

Where the calcium source is calcium hydroxide, the percentage of dry ingredients, in the fresh fruit preservative is preferably from about 70% to about 90%, more preferably from about 75% to 88%, most preferably from about 80% to about 85%, ascorbic acid, and from about 10% to about 35%, more preferably from about 12% to about 25%, most preferably from about 12% to about 20%, calcium hydroxide.

Where the calcium salt is calcium carbonate, the percentage of dry ingredients, in the fresh fruit preservative is preferably from about 70% to about 90%, more preferably from about 75% to about 85%, most preferably from about 77% to about 80%, ascorbic acid and from about 10% to about 30%, more preferably from about 15% to about 25%, most preferably from about 20% to about 23%, calcium carbonate.

Preferably the dry ingredients are mixed together to form a dry mixture which is then added to water to form the fresh fruit preservative solution. Preferably the fresh fruit preservative solution is used shortly, within hours, after being prepared.

The fresh fruit preservative solution contains preferably from about 0.075% to a saturated solution, more preferably from about 0.225% to about 12.25%, even more preferably from about 0.375% to about 6%, calcium salt; and preferably from about 0.2% to about 30%, more preferably from about 1.0% to about 8.5%, more preferably from about 1.6% to about 3.4%, ascorbic acid or the stereo isomer of ascorbic acid, erythorbic acid.

The fresh fruit preservative solution preferably has an ion or mole ratio of ascorbate ion to calcium ion, or ascorbate acid to calcium salt, of from about 1.5:1 to about 2.5:1, more preferably about from about 1.8:1 to about 2.2:1, most preferably about 2:1. The fresh fruit preservative solution preferably has a weight ratio of ascorbate ion to calcium ion, of from about 5:1 to about 10:1, more preferably about from about 8.5:1 to about 9:1, most preferably about 8.7:1 to about 8.9:1.

The fresh fruit preservative solution preferably has a weight ratio of ascorbate acid to calcium salt, of from about 1.2:1 to about 6:1, more preferably about from about 2:1 to about 5:1, most preferably about 2.2:1 to about 4.8:1.

The preferred embodiment of the fresh fruit preservative solution has from about 0.5% to saturated solution of about 35%, preferably 1.5% to about 10%, more preferably from about 2.5% to about 4% calcium ascorbate. A slight off flavor is detected in the fresh fruit preserved with calcium ascorbate solution of more than about 6%, thus solution of greater than about 6% are less preferred for fruit that is to be eaten raw. However solution of 6% or greater a acceptable when the fruit is to be used as component in a cooked or spiced food product where such taste is not perceptible.

The pH range of the fresh fruit preservative solution is preferably from about 1.7 to about 10, more preferably from about 3.5 to about 8.0, most preferably from about 3.7 to about 7.5. The pH is adjusted if needed with conventional reagents such as for example, sodium hydroxide or calcium hydroxide.

Preferably the fresh fruit preservative lacks citric acid. Preferably, the fresh fruit preservative solution does not have a chloride ion concentration greater than 1.5%, more preferably not greater than 0.5%; the chloride concentration of the fresh fruit preservative ingredients excluding water, is not greater than about 15%, preferably not greater than about 13%. Preferably, the fresh fruit preservative solution does not have a sodium ion concentration greater than about 1%; more preferably not greater than about 0.5%. The sodium concentration of the fresh fruit preservative ingredients excluding water, is not greater than about 10%, more preferably not greater than about 4%.

Preferably the fresh fruit preservative lacks a metal ion sequestrant particularly an acidic polyphosphate metal ion sequestrant or chelant or is essentially free of a metal ion sequestrant. Essentially free means that the fresh fruit preservative, has nothing greater than minor amount of impurities of metal ion sequestrant, for example less than 0.5% of the ingredients exclusive of the water.

The Method of Preserving Fruit with the Fresh Fruit Preservative

The fresh fruit such as for example, apples, pears or avocados, are preferably first sanitized to reduce or eliminate microorganisms on the surface of the fruit skin. Good results have been obtained using a 50–100 ppm sodium hypochlorite solution. The fruit is then processed such as for example, by paring, slicing, coring, dicing, peeling or a combination thereof; and then the fruit preservative is applied. The fruit preservative is applied by conventional techniques such as spraying, dipping, sprinkling tossing, immersing or drenching. Dipping involves immersing the fruit into a solution of fruit preservative and is generally preferred. Good results have been obtained by dipping fruit about 1–2 minutes. Longer dipping times are also employed; however at fresh fruit preservative concentrations of 6% weight per volume or higher, the ascorbic acid dipping times over 5 minutes can effect flavor.

The apples are then preferably placed in package to prevent or reduce drying where the fruit is to be transported or sitting on a shelf. However, where the fruit is to be consumed with several hours from slicing or peeling the fruit is preferably not packaged. Suitable packaging includes for example, 2 mil polyethylene bags, 4 mil polyethylene bags, polystyrene "clam shell" packages, multi-layer polyolefin bags such as Food Saver bags Cryovac PD900, or Cryovac B900, bag from Cryovac Inc., containers having a polyethylene bag, without a seal, in a cardboard box. Preferably the fresh fruit is stored at below 30° C., more preferably below 25° C., even more preferably below 10° C., even more preferably below 5° C., to reduce microbial growth. While the fruit may be stored at ambient temperatures around 20° C., shelf life is increased by storing below 20° C. preferably below 10° C. The fruit is preferably stored above 0° C. to prevent freezing.

Evaluation of Preserved Apples

As a result of being preserved with fresh fruit preservative, the degradation of the color of the fruit is substantially reduced. For fruits having white flesh such as apples the whiteness of fruit preserved with the fresh fruit preservative is preferably determined using a colorimeter according to the method described in "Reporting of Objective Color Measurements" *HortScience*, Vol. 27(12), December 1992, a publication of the American Society for Horticultural Science Alexandria, Va. The L*, a*, and b* values obtained according to the methods in such article are then converted to whiteness according to the following formula:

$$\text{Whiteness} = 100 - ((100-L)^2 + a^2 + b^2)^{1/2}$$

For fruits having non-white flesh the L, a, b, values are measured as described above and the fresh color index is determined according to the following formula:

$$\text{Fresh Color Index} = 100 - ((L_0-L_i)^2 + (a_0-a_i)^2 + (b_0-b_i)^2)^{1/2}$$

The whiteness of the fruit of the following examples was determined using Minolta Chroma Meters CR2000 from Minolta and ColorTec-PCM Personal Color meter from ColorTec. Fruits preserved with the fresh fruit preservative typically maintain greater than about 90% of their whiteness at 14 days, even 21 days as compared fresh sliced fruit.

The firmness or hardness of the fruit is the force required for a probe to penetrate the fruit a given distance into the fruit. The firmness is determined using a Quality and Test System 25 and TA 40 probe from Stevens Company. The TA 40 probe a black acetate, 4.5 mm diameter, 20 mm long rod probe having a flat end. The following settings were employed in the QTS system: the test type is a compression test of one cycle, 0 second hold time, 0 second recovery, 5 g trigger point, 30 mm/min test speed, target unit distance, and a target value of 3 mm. The apple pieces were 1 cm thick.

The texture, flavor, and moistness of the fruit were evaluated by tasting fruit samples. Color was also evaluated by visual inspection. The color, texture, moistness and flavor were then evaluated according to a scale of either 1 to 10, or 1 to 15, with 10 or 15, being the value assigned to a freshly cut piece of comparative fruit.

The following mixtures containing the dry ingredients of the fresh fruit preservatives are typical Examples and not intended to be limiting. The ingredients were FCC or USP grade unless otherwise indicated.

EXAMPLE S1

A fresh fruit preservative containing 100% calcium ascorbate.

EXAMPLE S2

A mixture containing the dry ingredients of the fresh fruit preservative containing 65.54% ascorbic acid, 27.4% calcium chloride, and 7.06% sodium hydroxide, was prepared by combining the following: 26.2 pounds ascorbic acid, 10.95 pounds of calcium chloride; 2.82 pounds sodium hydroxide.

EXAMPLE S3

A mixture containing the dry ingredients of the fresh fruit preservative containing 60.57% ascorbic acid, 25.33% calcium chloride, and 14.10% sodium hydroxide, was prepared by combining the following: 26.2 pounds ascorbic acid; 10.96 pounds calcium chloride; and 6.10 pounds sodium hydroxide.

EXAMPLE S4

A mixture containing the dry ingredients of the fresh fruit preservative containing 75.33% ascorbic acid, 17.53% calcium chloride, and 7.14% calcium hydroxide, was prepared by combining the following: 26.2 pounds ascorbic acid; 6.10 pounds calcium chloride; and 2.48 pounds calcium hydroxide.

EXAMPLE S5

A mixture containing the dry ingredients of the fresh fruit preservative containing 82.56% ascorbic acid, and 17.44% calcium hydroxide, was prepared by combining 26.2 pounds ascorbic acid; and 5.53 pounds calcium hydroxide.

EXAMPLE S6

A mixture containing the dry ingredients of the fresh fruit preservative containing 73.65% ascorbic acid, 17.14% calcium chloride and 9.221% calcium carbonate, was prepared by combining the following: 26.2 pounds ascorbic acid; 6.10 pounds calcium chloride, and 3.28 pounds calcium carbonate.

EXAMPLE S7

A mixture containing the dry ingredients of the fruit preservative containing 77.85% ascorbic acid and 22.15% calcium carbonate, was prepared by combining the following: 26.2 pounds ascorbic acid; and 7.45 pounds calcium carbonate.

EXAMPLE S8

A mixture containing the dry ingredients of the fresh fruit preservative containing 48.86% erythorbic acid, 40.72% calcium chloride and 10.42% sodium hydroxide, was prepared by combining the following: 12.53 pounds erythorbic ascorbic acid; 10.44 pounds calcium chloride; and 2.67 pounds sodium hydroxide.

Examples S1 to S8 are mixed with water to obtain a fresh fruit preservative solution. Example S1 is also used as a dry fresh fruit preservative, however the appearance is less preferred due to clumping of the fresh fruit preservative on the surface of the fruit.

Methods of Preserving Fresh Fruit Using the Fresh Fruit Preservative

EXAMPLE 1

Red Delicious apples were preserved with the fresh fruit preservative. First, the whole apples were dipped into a 1% sodium hydroxide solution. The apples were then rinsed with water, sanitized with 75 ppm sodium hypochlorite solution, then peeled, cored, and sliced. The apple slices were dipped into the 3% (w/v) calcium ascorbate fresh fruit preservative solution of Example S1 for either 1, 3, or 5 minutes. The apples were then removed from the solution and drained for one minute. The apple slices were sealed in Food Saver bags plastic bags from Cable Kitchen, the apples were stored at 5° C. for 13 days and then evaluated. The results are shown in Table 1.

TABLE 1

Evaluation of Sliced Apples Preserved with Fresh Fruit Preservative

| Dipping Time (minutes) | Color | Texture | Moistness | Flavor | Overall Acceptability |
| --- | --- | --- | --- | --- | --- |
| Control ascorbic acid (0) | 9.44 | 11.39 | 11.37 | 11.68 | 11.17 |
| 1 | 12.36 | 12.19 | 10.80 | 11.47 | 11.93 |
| 3 | 12.86 | 12.24 | 12.33 | 11.33 | 11.72 |
| 5 | 12.22 | 10.03 | 10.72 | 9.75 | 10.07 |

Evaluated on a scale of 1 to 15, where 15 represents the highest/best
* control apples were cut before evaluation

EXAMPLE 2

Cortland and Red Delicious apples were preserved with the fresh fruit preservative. The whole apples were washed, peeled, cored, and sliced. The apple slices were dipped for one minute into the following fresh fruit preservative solutions: 2.8% calcium ascorbate solution; a solution containing 2.32% ascorbic acid, 0.97% calcium chloride, and 0.25% sodium hydroxide; a solution containing 2.32% ascorbic acid and 0.97% calcium chloride, and 0.54% sodium hydroxide; a solution containing 2.32% ascorbic acid, 0.54% calcium chloride, and 0.22% calcium hydroxide; a solution containing 2.32% ascorbic acid, and 0.49% calcium hydroxide; a solution containing 2.32% ascorbic acid, and 0.54% calcium chloride and 0.29% calcium carbonate; a solution containing 2.32% ascorbic acid and 0.66% calcium carbonate; and a solution containing 1.5% erythorbic acid, 1.25% calcium chloride and 0.32% sodium hydroxide. The apple slices were removed from the solution and drained for one minute. Then the apple slices were sealed in Cryovac PD900 bags from Cryovac Inc. and stored at 5° C. for 21 days. The results are shown in Table 2.

TABLE 2

Effect of Various Fresh Fruit Preservatives on Color, Texture, Flavor and Moisture of Apples

| Ex. | % w/v | color | flavor | texture | moist. |
| --- | --- | --- | --- | --- | --- |
| S1 | 2.80 | 14.5 | 14.0 | 14.0 | 14.0 |
| S2 | 3.54 | 14.5 | 14.0 | 14.0 | 14.0 |
| S3 | 3.83 | 15.0 | 14.0 | 14.0 | 14.0 |
| S4 | 3.08 | 15.0 | 14.0 | 12.0 | 13.0 |
| S5 | 2.81 | 14.5 | 14.0 | 13.0 | 12.0 |
| S6 | 3.15 | 15.0 | 14.0 | 14.0 | 14.0 |
| S7 | 2.98 | 14.25 | 15.0 | 12.0 | 14.25 |
| S8 | 3.07 | 15.0 | 13.0 | 13.0 | 14.0 |

After 21 days, the apple slices were not significantly different from fresh cut apples in color, texture, flavor and moistness. Immediately after dipping and for several days thereafter, the apples preserved with the fresh fruit preservative of Examples s2, s3, s4, s6, and s8 had a slightly salty after taste. This salty taste decreased gradually and disappeared in a couple days. The apples preserved the fresh fruit preservative of Examples s1, s5 and s7 did not have the after taste.

EXAMPLE 3

Granny Smith apples were preserved as in Example 2 except that 0.5% and 1.55% of the calcium ascorbate fresh fruit preservative solution of example s1, were employed and the dipping time was either 5 minutes or 20 minutes. The apple slices were sealed in 2 mil. polyethylene bags and stored at 2–5° C. for 21 days. The results are shown in Table 3.

TABLE 3

Effect of Varying Concentration of Calcium Ascorbate Solution And Contact Time on Granny Smith Apple Slices

| Concentration ascorbic acid(%) | Dipping Time (minutes) | Began Browning at |
| --- | --- | --- |
| 0.5 | 5 | 6 days |
| 0.5 | 20 | 6 days |
| 1.5 | 5 | 19 days |
| 1.5 | 20 | 19 days |

As can be seen from Table 3, the 0.5% solution of the fresh fruit preservative is less preferred for sliced apples which are to sit on a shelf, however it is suitable for preserving apples for short term as in consumer, catering and restaurant use. Other work with granny smith apples showed that concentration of 3.8% preserved the apples for 21 days.

EXAMPLE 3a

Red Delicious apples were preserved as in Example 3, except with different concentrations of the fresh fruit preservative solution of example s1, The results are shown in Table 4.

TABLE 4

Effect of Concentration of Calcium Ascorbate Solution And Contact Time on Red Delicious Apple Slices

| Concentration (%) | Dipping Time (min.) | Began Browning in: |
| --- | --- | --- |
| 0.25 | 5 | 1 hour |
| 0.25 | 20 | 1 hour |
| 0.50 | 5 | 1 hour |
| 0.50 | 20 | over night |
| 1.00 | 5 | over night |
| 1.00 | 20 | over night |
| 1.50 | 1 | 2 days |
| 1.50 | 5 | 3 days |
| 1.50 | 20 | 3 days |
| 2.00 | 1 | 2 weeks |
| 2.00 | 5 | 2 weeks |
| 2.00 | 20 | 2 weeks |

Overnight - about 8–20 hours

As can be seen from Table 4, a concentration of calcium ascorbate solutions 0.25%, are not preferred for the preservation of Red Delicious apples beyond about 1 hour; however, such concentrations are useful for preserving fruit for limited times such as in restaurant, catering and consumer use where the fruit is to be consumed within hours. Red Delicious apples, a variety highly susceptible to browning, lasts about 14 days before browning when preserved at with a fresh fruit preservative concentration of 2.00%.

EXAMPLE 3b

Red Delicious apples were preserved as in Example 3, except 5%, 10%, 15% and 22.5% fresh fruit preservative solutions of example s1 were employed and the apples were stored, then evaluated at three weeks. The results are shown in Table 5.

TABLE 5

Effect of Varying Concentration of Fresh Fruit Preservative Solution and Contact Time on Preservation of Red Delicious Apple Slices

| Concentration (%) | Dipping Time (min.) | Color | Flavor | Texture | Moistness |
| --- | --- | --- | --- | --- | --- |
| 5 | 1 | 10 | 9.5 | 10 | 10 |
| 10 | 1 | 10 | 9.5 | 10 | 10 |
| 15 | 1 | 10 | 9.5 | 10 | 10 |
| 22.5 | spray | 10 | 9.0 | 10 | 9 |
| 22.5 | Drench | 10 | 9.5 | 10 | 10 |
| 22.5 | 1 | 10 | 9.3 | 10 | 10 |
| 22.5 | 5 | 10 | 9.3 | 10 | 10 |

EXAMPLE 4

Sliced Golden apples, Bosc pears and Bartlett pears were preserved as in Example 3 except a 3.8% of calcium ascorbate solution of Example S1 was employed for a dipping time of 1, 3 or 5 minutes. The fruit was stored; color, flavor, texture and moistness were determined at 2 weeks and the preserved apples were followed for over three weeks to determine the onset of browning. The results are shown in Table 6.

TABLE 6

Evaluation of Pears and Apples Preserved with the Fresh Fruit Preservative

| Variety | Dipping Time (min.) | Began to Brown in: | Color | Flavor | Texture | Moistness |
|---|---|---|---|---|---|---|
| Bartlett Pears | 0 control | 4 hours | / | / | / | / |
|  | 1 | over 3 wks. | 10 | 10 | 10 | 10 |
|  | 3 | over 3 wks. | 10 | 10 | 10 | 10 |
|  | 5 | over 3 wks. | 10 | 10 | 10 | 9.5 |
| Bosc Pears | 0 control | 30 min. | / | / | / | / |
|  | 1 | 10 days | 9.5 | 10 | 10 | 9.0 |
|  | 3 | 10 days | 9.0 | 10 | 10 | 9.0 |
|  | 5 | 10 days | 8.0 | 10 | 10 | 9.0 |
| Golden apples | 0 control | 30 min. | / | / | / | / |
|  | 1 | over 3 wks. | 10 | 10 | 10 | 10 |
|  | 3 | over 3 wks. | 10 | 10 | 10 | 10 |
|  | 5 | over 3 wks. | 10 | 10 | 10 | 9.5 |

EXAMPLE 5

Avocados were preserved with fresh fruit preservative, The avocados were halved, pitted, and peeled. The slices were cut by using a stainless steel paring knife. The avocado pieces were either dipped in 34% calcium ascorbate solution of Example s1 for 2 minutes or sprayed with a 2% sodium Alginate solution followed by dipping in 34% calcium ascorbate solution. The sections were placed on plates with small dessicators used humidors. Water in the lower section maintained the relative humidity at higher than 98%. The Fresh Color Index was determined and the results are shown in Table 7.

TABLE 7

Fresh Color Index of Avocados Preserved with the Fresh Fruit Preservative

| Hours | Control | Calcium ascorbate | Alginate Calcium Ascorbate |
|---|---|---|---|
| 0 |  |  |  |
| 0.32 | 100.00 | 100.00 | 100.00 |
| 26.95 | 90.50 | 92.35 | 93.30 |
| 92.75 | 81.02 | 92.37 | 93.21 |
| 115.50 | 78.05 | 93.37 | 92.46 |
| 143.70 | 77.22 | 93.31 | 91.95 |
| 164.53 | 72.99 | 93.38 | 93.63 |
| 236.07 | 72.50 | 86.88 | 92.15 |
| 262.68 | 71.66 | 90.21 | 92.74 |
| 284.76 | 72.05 | 87.97 | 90.58 |
| 309.07 | 68.20 | 90.34 | 91.49 |
| 333.28 | 68.83 | 86.99 | 89.69 |
| 417.33 | 68.60 | 84.39 | 88.74 |

EXAMPLE 6

Red Delicious apple slices were preserved as in Example 3, except that the apple slices were dipped for one minute in the fresh fruit preservative solution which contained 3.14% ascorbic acid and 1.32% calcium chloride. The pH was adjusted to different pH values with sodium hydroxide. The apple slices were evaluated at one week and two weeks. The results are shown in Table 8.

TABLE 8

Effects of pH Value of Fresh Fruit Preservative Solutions on Preservation of Apple Slices

| | Sensory Scores | | | | | | | |
|---|---|---|---|---|---|---|---|---|
| | color | | flavor | | moisture | | texture | |
| pH of | Storage Time (weeks) | | | | | | | |
| solution | 1 | 2 | 1 | 2 | 1 | 2 | 1 | 2 |
| 2.20 | 10 | 10 | 9.5 | 7 | 9.5 | 9.5 | 10 | 7 |
| 3.07 | 10 | 10 | 9.5 | 7 | 9.5 | 9.5 | 10 | 7 |
| 3.80 | 10 | 10 | 9.5 | 9 | 9.5 | 9.5 | 10 | 10 |
| 7.07 | 10 | 10 | 9.5 | 8 | 9.5 | 9.5 | 10 | 10 |
| 8.02 | 10 | 10 | 9.3 | 9 | 9.5 | 9.5 | 10 | 10 |
| 9.43 | 10 | 10 | 9.3 | 9 | 9.5 | 9.5 | 10 | 10 |

EXAMPLE 7

Red Delicious apples were preserved with fresh fruit preservative by cleaning with a toothbrush, dipping into a 0.5% Sodium Hypochlorite solution, rinsing with tap water, then slicing. The apple slices were dipped in 3.8% calcium ascorbate fresh fruit preservative solution of example s1, having a temperature of either 5° C., 12° C. or 24° C. for 5 minutes. The apple slices were drained, then sealed in polyethylene bags and stored at 5° C. for two weeks then evaluated. The results are shown in Table 9.

TABLE 9

Effects of Temperature of Fresh Fruit Preservative Solutions on Apple Slices

| | | Sensory Scores | | |
|---|---|---|---|---|
| Temperature (° C.) | Whiteness | Color | Flavor | Texture |
| 5 | 69.09 | 7.90 | 7.70 | 8.70 |
| 12 | 67.93 | 7.60 | 8.10 | 8.60 |
| 24 | 73.98 | 9.10 | 8.30 | 9.10 |

Whiteness: calculated from L*, a* and b* values measured by Colorimeter.
sensory scores - scale of 1–10 was used

EXAMPLE 8

Idared and Granny Smith apples were preserved as in Example 2 except that unpeeled and peeled sliced apples were prepared. The apple slices were dipped in 3.8% calcium ascorbate fresh fruit preservative solution of example s1 for one minute. Drained apple slices were sealed in either Cryovac bags PD900, 4 mil PE bags, or Clam Shell, and stored at 2–5° C. or –6.6° C. for two weeks. The results are presented in Table 9. The scores are based on value of 1 to 10 where 10 is the value given to freshly cut apples. The results are shown in Table 10.

TABLE 10

Effects Packaging on Preservation of Apple Slices

| | | | | Sensor Scores (All fresh cut are 10) 2 week storage | | | |
|---|---|---|---|---|---|---|---|
| temp. | Var. | Peeled | Package | Color | Flavor | Text. | Moist. |
| 2–5° C. | Ida Red | yes | Cryovac | 8.0 | 9.0 | 10.0 | 10.0 |
| | | | PE | 9.0 | 9.0 | 10.0 | 10.0 |
| | | | Clam Shell | 10.0 | 9.5 | 10.0 | 10.0 |
| | | no | Cryovac | 9.5 | 9.5 | 10.0 | 10.0 |
| | | | PE | 10.0 | 9.0 | 10.0 | 10.0 |
| | | | Clam Shell | 10.0 | 9.8 | 10.0 | 10.0 |
| | Granny Smith | no | Cryovac | 5.0 | / | / | 10.0 |
| | | | PE | 10.0 | 9.0 | 10.0 | 10.0 |
| | | | Clam Shell | 10.0 | 10.0 | 10.0 | 10.0 |
| –6.6° C. | Ida Red | yes | Cryovac | 9.0 | 9.0 | 9.0 | 10.0 |
| | | | PE | 10.0 | 10.0 | 10.0 | 10.0 |
| | | | Clam Shell | 10.0 | 10.0 | 10.0 | 10.0 |
| | | no | Cryovac | 10.0 | 9.0 | 10.0 | 10.00 |
| | | | PE | / | / | / | / |
| | | | Clam Shell | 9.0 | 10.0 | 10.0 | 10.0 |
| | Granny Smith | no | Cryovac | 5.0 | / | 5.0 | 10.0 |
| | | | PE | 10.0 | 10.0 | 10.0 | 10.0 |
| | | | Clam Shell | 9.0 | 10.0 | 10.0 | 10.0 |

EXAMPLE 9

Cortland apple slices were preserved as in Example 2, except that the apple slices were dipped in 3.8% calcium ascorbate fresh fruit preservative solution for one minute. Drained apple slices were sealed in Cryovac bags with different package sizes and bag sizes. They were stored at 2–5° C. for 3 weeks, then compared to freshly cut control apples. The results are shown in Table 11.

TABLE 11

Effects of Packaging on Preservation of Apple Slices

| treat. | apples/ bag | Bag Size (in.) | Firmness (g) | Sensor Scores (3 week storage) | | | |
|---|---|---|---|---|---|---|---|
| | | | | Color | Flavor | Text. | Moist. |
| pres. | 2 | 8 × 15 | 1626.167 | 13.0 | 11.4 | 12.2 | 11.8 |
| pres. | 4 | 8 × 15 | 1545.333 | 12.7 | 10.4 | 11.6 | 11.6 |
| pres. | 6 | 8 × 15 | 1489.333 | 12.5 | 10.8 | 11.4 | 11.4 |
| pres. | 6 | 12 × 20 | 1320.000 | 12.3 | 10.8 | 11.8 | 11.8 |
| pres. | 24 | 12 × 20 | 1559.500 | 12.5 | 12.2 | 12.0 | 12.0 |
| not pres. | 2 | 8 × 15 | 682.333 | 2.8 | 6.0 | 7.0 | 7.8 |
| fresh cut cont. | 2 | | 1054.500 | 11.25 | 8.5 | 8.0 | 10.5 | pres.-preserved

EXAMPLE 10

Red Delicious apple slices were preserved as in Example 3, except that the apple slices were dipped in a fresh fruit preservative solution of 3.8% of calcium ascorbate solution of example sl for one minute. The apple slices were sealed in 2 mil PE bag or placed in an open glass jar. They were stored at either 25° C. or 2–5° C. Control apple slices which were not treated with the fresh fruit preservative solution were prepared for comparison. The results are shown in Table 12.

TABLE 12

Effects of Storage Temperature and Sealed or Open Package on Apple Slices

| | Storage | Package Sealed or Opening | Began to browning in: |
|---|---|---|---|
| preserved | 25° C. | Sealed | 3 days |
| | | Open | 3 days |
| | 2–5° C. | Sealed | over 3 weeks |
| | | Open | over 3 weeks but dried in 2 weeks |
| control | 25° C. | Sealed | 5 minutes |
| | | Open | 5 minutes |
| | 2–5° C. | Sealed | 30 minutes |
| | | Open | 30 minutes |

EXAMPLE 11

Red Delicious apple slices were prepared as Example 1. The apple slices were dipped in the fresh fruit preservative solution containing 2.360% of ascorbic acid, 0.98% of calcium chloride and 0.25% of sodium hydroxide for one minute. Drained apple slices were sealed in Cryovac bag and stored at 2–5° C. for 21 days. The results are shown in Table 13; control non-preserved apples are offered for comparison.

TABLE 13

Comparison of Microbial Counts on Preserved and Non-preserved Apple Slices

| | | Microbial Counts (log cfu/g) | | | | | |
|---|---|---|---|---|---|---|---|
| Apple | Time (days) | Aerobic Bacteria | Coliform | Yeast | Mold | White-ness | Firm-ness |
| Ex. 11 | 0 | — | — | — | — | 64.64 | 937.5 |
| control | 0 | — | — | — | — | 63.06 | 630.5 |
| Ex. 11 | 1 | 1.35 | 0.96 | 0.48 | 0.48 | — | — |
| control | 1 | ND | ND | 0.86 | 1.21 | — | — |
| Ex. 11 | 14 | 2.24 | 0.94 | 1.46 | 2.06 | 62.28 | 942.5 |
| control | 14 | 6.58 | 6.19 | 3.62 | 3.86 | 49.11 | 494.5 |
| Ex. 11 | 21 | 2.90 | ND | 2.61 | 3.78 | 61.00 | 883 |
| control | 21 | 7.36 | 7.01 | 4.22 | 4.12 | 45.72 | 360.3 |

*E. coli* was not detected on any of the above samples
ND - not detected

Comparison of Fresh Fruit Preservative and Citric Acid

Granny Smith and Red Delicious apples were preserved as in Example 3 with of fresh fruit preservative solution contain 3.8% calcium ascorbate. For comparison, granny smith and red delicious apples were sprinkled with or dipped in fresh lemon juice. The results are shown in Table 14.

TABLE 14

Browning Times and Taste in Apples Preserved with Fresh Fruit Preservative and in Apples Treated with Lemon Juice

| Apple Variety | Treatment | Taste after Treatment | Began Browning in: |
|---|---|---|---|
| Granny Smith | lemon juice/sprinkle | very sour | 30 hours |
| | lemon juice/dipped 1 minute | very sour | 30 hours |
| | lemon | very sour | 20 hours |

TABLE 14-continued

Browning Times and Taste in Apples Preserved with Fresh Fruit Preservative and in Apples Treated with Lemon Juice

| Apple Variety | Treatment | Taste after Treatment | Began Browning in: |
|---|---|---|---|
| | juice/dipped 5 minutes | | |
| | untreated control | / | 4.5 hours |
| Red Delicious | lemon juice/ sprinkle | sour | 1 hour |
| | lemon juice/dipped 1 minute | very sour | 2 days |
| | lemon juice/dipped 5 minutes | very sour | 2 days |
| | untreated control | / | 5 minutes |
| | preserved | no change | over 3 weeks |

As can be seen from Table 14, the comparative example of the lemon juice increased the time before browning as compared to the untreated control. However, the apples preserved with the fresh fruit preservative far surpassed the apples treated with the lemon juice; the red delicious lasted over 3 weeks whereas the apples with the lemon juice lasted only 2 days. Most significantly, apples treated with lemon juice had a distinct sour taste and were soft and soggy. The apples preserved with the fresh fruit preservative did not have a sour taste; they were crisp and not soggy.

Comparison of Commercial Fruit Fresh™ Preservative to Fresh Fruit Preservative

Red Delicious apples were preserved as in Example 2, except that the following fresh fruit preservative solutions were employed: a 4.5% solution containing 1.41 g ascorbic acid, 0.59 g calcium chloride and 0.15 g sodium hydroxide in 45 ml distilled water; a 3.8% solution containing 1.7 g calcium ascorbate in 45 ml distilled water; and a 3.8% solution containing 11.4 g of calcium ascorbate in 300 ml distilled water.

For comparison, red delicious apples slices were dipped in a commercially available "preservative" known as Fruit Fresh™ distributed by Altrispa Corp., Munci Ind. Fruit Fresh™ preservative contains ascorbic acid, dextrose and silicon dioxide. Four solutions of the Fresh fruit were prepared as recommended by the package: a 22.9% solution containing 8 g Fruit Fresh™ in 35 ml distilled water; a 22.3% solution containing 11.5 g Fruit Fresh™ preservative in 51.6 ml distilled water; a 1.9% solution containing 9 g Fruit Fresh™ in 473 ml distilled water and a 2.7% solution containing 10.3 g Fruit Fresh™ in 378 ml distilled water. Apple slices were also tossed with dry Fruit Fresh™ preservative. The apple slices were packed in both one quart jar and Cryovac bag stored at 2–5° C. The results are shown in Table 15.

TABLE 15

Differences in Browning Times between Commercial Fruit Fresh ™ Preservative and Fresh Fruit Preservative

| Solution | Application | Began Browning in: |
|---|---|---|
| 22.9% Fruit Fresh ™ | spray 35 ml/32 s | 3 hours |
| 22.3% Fruit Fresh ™ | spray 52 ml/32 s | 4 hours |

TABLE 15-continued

Differences in Browning Times between Commercial Fruit Fresh ™ Preservative and Fresh Fruit Preservative

| Solution | Application | Began Browning in: |
|---|---|---|
| 1.9% Fruit Fresh ™ | dip for 2 minutes 473 ml/32 s | 30 minutes |
| 2.7% Fruit Fresh ™ | dip for 2 minutes 378 ml/32 s | 2 hours |
| Fruit Fresh ™ dry | toss 4 g/32 s | 3 hours |
| ascorbic acid/CaCl$_2$/ NaOH | spray 45 ml/32 s | 2 days |
| 3.8% calcium ascorbate | spray 45 ml/32 s | 6 days |
| 3.8% calcium ascorbate | dip for one minute 311 ml/32 s | over 3 weeks | s - slices

As can be seen from Table 15, treatment with the commercial Fruit Fresh staved of browning for at most about 4 hours. However, the apples preserved with the fresh fruit preservative lasted over 3 weeks when dipped and over 6 days when sprayed.

Comparison of Fresh Fruit Preservative to Commercial Preservative Snow Fresh Preservative Red Delicious apple slices were preserved as in Example 3 with a fresh fruit preservative solution of 2.6% ascorbic acid and 0.72% calcium carbonate containing 5.2 ascorbic acid and 1.44 g calcium carbonate in 197 ml distilled water.

For comparison, apple slices were treated with two conventional solutions; solution A contained 2 g ascorbic acid, 4 g. calcium chloride, 2 g. citric acid, and 4 g sodium acid pyrophospate in 188 ml distilled water; solution B contained 6.2 g calcium chloride, 8 g citric acid and 6.2 g table salt in 180 ml distilled water. The results are shown in Table 16.

TABLE 16

Comparison of Browning Times of Apples preserved with Fresh Fruit preservative to Apples treated with Conventional Preservative

| Solution | Application | Taste After Treatment | Began Browning in: |
|---|---|---|---|
| A ascorbic acid/calcium chloride/ citric acid/ sodium acid pyrophosphate | dip for 20 minutes | very strong taste and unacceptable | 9 days |
| B calcium chloride/ citric acid/ table salt | dip for one minute | very strong taste and unacceptable | 12 days |
| fresh fruit preservative | dip for one minute | no change from fresh cut apples | 23 days |

As can be seen in Table 16, the conventional preservative solutions A and B both had an unpleasant taste. However, the apples preserved with the fresh fruit preservative had the same taste as fresh cut apples.

Comparison of Fresh Fruit Preservative to Various Preservatives

The following solutions were prepared: solution A, a 0.5% carrageenan/1% algenate solution containing 1 g carrageenan, 2 g alginate in 197 ml $H_2O$; Solution B, a 1.5% alginate, 3.5% ascorbic acid solution, containing 3 g alginate, 7 g ascorbic acid in 190 ml $H_2O$; Solution C a 3.83% calcium ascorbate solution containing 7.66 g calcium ascorbate in 192.34 ml $H_2O$; Solution D, a 3.52% ascorbic acid solution containing 9.02 g ascorbic acid in 193 ml water; Solution E: a 3.73% $CaCl_2$ solution containing 10.12 g of $CaCl_2.2H_2O$ in 190.0 ml $H_2O$; Solution F, a 0.89% Snow Fresh solution; and Solution G, a 2.91% Snow Fresh solution. The Snow Fresh preservative lists as its ingredients calcium chloride, ascorbic acid, citric acid sodium acid pyrophosphate.

The carrageenan was obtained under the trade name Gelcarin GP812 from Marine Colloids; the alginate was obtained under the trade name Manugel GMB from Kelco; the ascorbic acid was obtained under the trade name Grandular from Pfizer; the calcium ascorbate was obtained from Pflatz and Bauer Inc.; and the calcium chloride ($CaCl_2.2H_2O$ usp: MW=147.02, was obtained from Fluka.

Sliced Red Delicious apples were sprayed with the above solutions. Sample 1 was sprayed with solution C;, sample 2 was sprayed with solution A then sprayed with solution C; sample 3 was sprayed with solution D; sample 4 was sprayed with solution B then sprayed with solution E; sample 5 was sprayed with solution B then sprayed with solution C; sample 6 was sprayed with solution F; sample 7 was sprayed with solution G; and a control was provided for comparison. The initial whiteness of the apples was determined and then the apples were then stored at either room temperature or 4° C. The whiteness was then determined at various time intervals as indicated in Table 17. The results are shown in Table 17.

TABLE 17

Whiteness Values for Various Preserved Apples Compared to Control

| Sample | 0 hr. | 14 hr. | 38 hr. | 61 hr. | 84.5 hr. |
| --- | --- | --- | --- | --- | --- |
| control | 64.86 | 64.20 | 63.75 | 62.06 | 62.52 |
| 1 3.83% calcium ascorbate | 71.98 | 74.22 | 73.57 | 71.58 | 69.57 |
| 2 carageen alginate/ 3.83% calcium ascorbate | 70.27 | 68.94 | 66.84 | 65.80 | 62.85 |
| 3 ascorbic acid | 70.94 | 67.59 | 68.05 | 68.68 | 66.43 |
| 4 alginate-ascorbic acid/$CaCl_2$ | 68.23 | 68.96 | 68.57 | 68.19 | 64.08 |
| 5 alginate-ascorbic acid treatment/ 3.83% calcium ascorbate | 68.85 | 68.69 | 68.61 | 69.84 | 67.19 |
| 6 0.9% Snow Fresh ™ | 68.92 | 66.00 | 63.89 | 61.10 | 60.48 |
| 7 3% Snow Fresh ™ | 70.71 | 68.90 | 66.84 | 65.80 | 62.85 |

As shown in Table 17, the apples treated with just the ascorbic acid solution did not perform as well as the apples which were preserved with the 3.83% calcium ascorbate fresh fruit preservative solution. Similarly, the apples treated with the commercial Snow Fresh™ solution did not perform as well as the apples preserved with the 3.83% calcium ascorbate fresh fruit preservative solution. Apples pretreated with alginate or carrageen before the calcium ascorbate did not perform as well as apples which did not receive such gum pre-treatment.

FIG. 1 further illustrates the difference in whiteness between apples of sample 1 which were preserved with the 3.83% calcium ascorbate fresh fruit preservative solution and the apples treated with ascorbic acid.

Comparison of Three Commercial Preservatives and the Fresh Fruit Preservative

Red Delicious apples were prepared as in Example 3 and treated with Ever Fresh solution containing 1 teaspoon per quart, Fruit Fresh solution containing 3 teaspoons per 2 quarts, Snow Fresh containing 1.5 pounds per 20 gallons and a calcium ascorbate solution 3% w/v. The control apples were provided which was treated with water. The apples were stored at 10° C. and evaluated at 0 hours, 72 hours and 168 hours. The results are shown in Table 18.

TABLE 18

Whiteness of Three Commercial Preservative Compared to the Fresh Fruit Preservative

| | Whiteness Storage Time (hours) | | |
| --- | --- | --- | --- |
| Formulation | 0 | 72 | 168 |
| Control | 70.14 + 1.7 | 62.1 + 2.6 | 60.9 + 2.6 |
| Ever Fresh ™ | 70.14 + 1.7 | 63.1 + 3.0 | 62.0 + 2.3 |
| Fruit Fresh ™ | 70.14 + 1.7 | 62.5 + 3.1 | 60.8 + 2.2 |
| Snow Fresh ™ | 70.14 + 1.7 | 64.8 + 2.4 | 62.4 + 2.3 |
| fresh fruit preservative-calcium ascorbate | 70.14 + 1.7 | 70.5 + 2.1 | 69.4 + 2.4 |

As seen in Table 18, the calcium ascorbate solution maintained the whiteness of the fruit substantially better than the commercial preparations.

Although several embodiments of this invention has been shown and described, various adaptations and modifications can be made without departing from the scope of the invention as defined in the appended claims.

What is claimed is:

1. A method for preserving fresh fruit comprising the following steps:
   a. providing a fresh fruit preservative solution comprising:
      calcium ions;
      ascorbate ions or erythorbate ions; and
      water;
         wherein the ascorbate ion or the erythorbate ion, and calcium ion are present in an ion ratio of from about 1.5:1 to about 2.5:1;
   b. applying said fruit preservative to the fruit.

2. The method of claim 1, wherein the fruit is stored at from about −7° C. to about 20° C.

3. The method of claim 1, wherein the fruit is stored at from about −2° C. to about 7° C.

4. The method of claim 1, wherein the ascorbate ion and calcium ion are present in a mole ratio of from about 1.8:1 to about 2.2:1.

5. The method of claim 1, wherein the preservative is essentially free of a metal ion sequestrant.

6. The method of claim 1, wherein the fruit is a tree fruit.

7. The method of claim 6, wherein the tree fruit is selected from the group consisting of pome fruits and avocados.

8. The method of claim 7, wherein the tree fruit is selected from the group consisting of apples, pears and avocados.

9. The method of claim 1, wherein the preservative is essentially free of sodium.

10. The method of claim 1, wherein the preservative has a chloride ion concentration less than about 1.5%.

11. The method of claim 1, wherein the method of applying the fresh fruit preservative is by dipping.

12. The method of claim 1, wherein the fresh fruit preservative solution is prepared by:
providing dry ingredients comprising:
from about 10% to about 100%, of a calcium source;
where the calcium source is other than calcium ascorbate or calcium erythorbate, then the dry ingredients further comprise from about 50% to about 90%, ascorbic acid or erythorbic acid; mixing the dry ingredients with the water.

13. The fresh fruit preservative of claim 12, wherein the calcium source is calcium hydroxide or a calcium salt.

14. The fresh fruit preservative of claim 13, wherein the calcium salt is selected from the group consisting of calcium chloride, calcium carbonate, calcium hydroxide, calcium phosphate, calcium erythorbate, calcium acetate, calcium gluconate, calcium glycerophosphate, calcium lacatate, calcium ascorbate and mixtures thereof.

15. The method of claim 12, wherein the dry ingredients consist essentially of: the calcium source; and, where the calcium source is other than calcium ascorbate or calcium erythorbate, then the dry ingredients consist essentially of the calcium source and ascorbic acid or erythorbic acid.

16. The method of claim 1, wherein the fruit is stored at from about −2° C. to about 7° C., the ascorbate ion and calcium ion are present in a ion ratio of from about 1.8:1 to about 2.2:1; the preservative is essentially free of a metal ion sequestrant and the fruit is a tree fruit.

17. The fresh fruit preservative of claim 16, wherein the calcium ion to ascorbate ion ratio is 2:1.

18. The method of claim 1 wherein the fruit does not brown for about 21 days.

19. The method of claim 1, wherein the fruit flesh is white and retains over about 90% of whiteness over 14 about days.

20. The method of claim 1, wherein the fruit flesh is non-white and retains over about 90% of color over about 14 days.

21. A fruit preserved according to the method of claim 1.

22. A method for preserving fresh fruit comprising the following steps:
a. providing a fruit preservative comprising:
0.5 to 100% calcium ascorbate or calcium erythorbate;
0 to 99.5% water; wherein the ascorbate ion or the erythorbate ion, and calcium ion are present in an ion ratio of from about 1.5:1 to about 2.5:1;
b. applying said fruit preservative to the fruit.

23. A preserved fruit according to the method of claim 22.

24. The method of claim 22 wherein the fruit preservative consists essentially of:
0.5 to 100% calcium ascorbate or calcium erythorbate; and
0 to 99.5% water.

25. A method for preserving fresh fruit comprising the following steps:
a. providing a fresh fruit preservative solution consisting essentially of:
calcium ion source;
ascorbate ion source or erythorbate ion source; and
water;
wherein the ascorbate ion or erythorbate ions and calcium ion are present in an ion ratio of from about 1.5:1 to about 2.5:1;
b. applying said fruit preservative to the fruit.

26. The method of claim 1, wherein the fresh fruit preservative solution is prepared by:
providing dry ingredients consisting essentially of:
from about 10% to about 100%, of a calcium source; and where the calcium source is other than calcium ascorbate or calcium erythorbate, then providing from about 50% to about 90%, ascorbic acid;
mixing the dry ingredients with the water.

27. A fruit preserved according to the method of claim 25.

28. A method for preserving fresh fruit comprising the following steps:
a. providing a fruit preservative consisting essentially of:
0.5 to 100% calcium ascorbate or calcium erythorbate;
0 to 99.5% water;
b. applying said fruit preservative to the fruit.

* * * * *

UNITED STATES PATENT AND TRADEMARK OFFICE
CERTIFICATE OF CORRECTION

PATENT NO.    : 5,939,117
DATED         : August 17, 1999
INVENTOR(S)   : Chao Chen et al.

It is certified that error appears in the above-identified patent and that said Letters Patent is hereby corrected as shown below:

Column 17, claim 17,
Line 39, delete "calcium ion to ascorbate ion" and add -- ascorbate ion to calcium ion --

Signed and Sealed this

Fifth Day of March, 2002

Attest:

JAMES E. ROGAN
*Attesting Officer*      *Director of the United States Patent and Trademark Office*